United States Patent [19]

Barta et al.

[11] 4,257,685
[45] Mar. 24, 1981

[54] ACOUSTO-OPTIC DEVICE

[75] Inventors: Cestmir Barta; Jiri Ctyroky, both of Prague, Czechoslovakia; Iraida M. Silvestrova; Jurij V. Pisarevskij, both of Moscow, U.S.S.R.

[73] Assignees: Ceskoslovenska Akademie ved, Prague, Czechoslovakia; Akademija Nauk SSSR, Moscow, U.S.S.R.

[21] Appl. No.: 6,498

[22] Filed: Jan. 25, 1979

[30] Foreign Application Priority Data

Feb. 3, 1978 [CS] Czechoslovakia ............. 715-78

[51] Int. Cl.³ .................................................. G02F 1/29
[52] U.S. Cl. .................................. 350/358; 331/94.5 F
[58] Field of Search ................. 350/358; 331/94.5 K, 331/94.5 L, 94.5 M

[56] References Cited

U.S. PATENT DOCUMENTS 3,843,234  10/1974  Dobrzhansky et al. .............. 350/358

*Primary Examiner*—William L. Sikes
*Assistant Examiner*—Leon Scott, Jr.

[57] ABSTRACT

A single crystal of pure or mixed univalent mercury halide, which is formed having a pair of opposed polished faces at least one of which is perpendicular to a direction which is inclined from the optical axis of the crystal about the crystallographic direction by an angle between 0.2° to 20.0°. Another face of the crystal is provided with a source of transverse acoustic waves.

5 Claims, 1 Drawing Figure

ACOUSTO-OPTIC DEVICE

BACKGROUND OF THE INVENTION

The invention concerns an acousto-optic device particularly suitable for deflecting light beams and in apparatus for processing of information wherein the diffraction of light on acoustic waves in the optically anisotropic medium a single crystal of univalent mercury halide.

Existing acousto-optic devices for deflecting light beams and for optical processing of information operate on the principle of the diffraction of the light wave by the application of an acoustic wave induced in a suitable acousto-optic medium by a piezoelectric transducer. By changing the frequency of the acoustic wave the deflection angle of the light beam is changed. By changing the amplitude of the acoustic wave the intensity of the deflected beam is controlled. The diffraction of the light beam on application of the acoustic wave can also result in a change of the polarization of the light wave. Depending upon the application in systems used for deflecting the light beams—e.g.: deflectors—and in systems used for processing of information, the most important parameters of the acousto-optic device are the diffraction efficiency, i.e. the ratio between the intensities of the deflected and incident beam, and the product of the time constant $\tau$ of the device with the width $\Delta f$ of the frequency band. This bandwidth is determined on one hand by the electric and acoustic properties of the piezoelectric transducer and on the other hand by the interaction bandwidth of the acoustic and light wave. An extremely large bandwidth of the acousto-optic interaction can be attained in an optically anisotropic medium by making use of the so-called abnormal diffraction, in which the polarization of the deflected light beam changes. In an optically uniaxial media the transverse acoustic wave is introduced, as a rule, in a direction parallel or perpendicular to the optical axis, whereas the direction of the incident beam is chosen so as to have the deflected beam emerging perpendicular to the optical axis.

In using the crystal types known so far, the described arrangement leads to rather high acoustic frequencies in the gigahertz range and the diffraction efficiency is low.

In the crystal of paratellurite, strong rotation of the polarization plane of light can be utilized for the construction of an acousto-optic device with abnormal diffraction and high diffraction efficiency. The operating frequency of such acousto-optic device is relatively low, in the range of tens of megahertz, depending on the wavelength of light employed. In this case, however, the incident light must have approximately circular polarization.

An acousto-optic deflector utilizing the abnormal diffraction in a rotated tellurium dioxide crystal is also known. The acoustic wave in the tellurium dioxide crystal propagates in the direction inclined at angle of 6° from the [110] axis in the $(1\bar{1}0)$ plane, with the $[1\bar{1}0]$ direction of vibrations. This arrangement retains the high efficiency of interaction and compensates for the drop of the diffraction efficiency in the middle of the frequency band. A disadvantage of this deflector is that the group velocity direction of the acoustic wave is inclined from the wave normal at a large angle, nominally 51.3°. Consequently, an extremely large crystal volume is required for the construction of such a deflector. Besides, deflectors made from the tellurium dioxide crystals cannot be used in the infrared spectral range beyond 5 $\mu$m. Another disadvantage is the relatively high price for the tellurium dioxide single crystals of the required dimensions and quality. In addition, still another disadvantage of the acousto-optic device made from tellurium dioxide consists in the fact that the acousto-optic quality factor $M_2$, which determines the diffraction efficiency for the diffraction by longitudinal waves, is rather small—about 1/30 of the value for the diffraction by transverse waves.

A acousto-optic device made from a single crystal of univalent mercury halide, is described by Dobrzhanskii et al. in the CSSR Author's Certificate No. 170 007, which has high value of the acousto-optic quality factor $M_2$ for both longitudinal and transverse waves, and which in addition transmits the radiation even in the infrared spectral rage with wavelength larger than 5 $\mu$m. A disadvantage of this device, however, is that, due to the low propagation velocity of the acoustic wave, sufficient frequency bandwidth can be obtained only by using a piezoelectric transducer of very small dimensions, whereby the requirements on the acoustic power density generated by the transducer are very severe.

There was also reported an acousto-optic device made from a single crystal of univalent mercury halide, pure or mixed, by Č. Bárta et al. in U.S. Application Ser. No. 968,930 filed Dec. 13, 1978; in which the single crystal is treated in the following way: at least one of the first pair of its opposite faces is formed perpendicular to the direction which is inclined from the direction of the optical axis of the crystal [001] about the crystallographic direction [HKO] by an angle whose value lies from 0.1° to 15.0°, the other crystal face is provided with the source of the acoustic wave being perpendicular to the above-mentioned face. This solution has resulted in significant advantages over the arrangements known till then; however, it did not suppress parasitic diffraction of light in unwanted directions, resulting therefore in a decrease of the diffraction efficiency within the frequency band of the acousto-optic device.

The above-mentioned shortcomings are avoided in the acousto-optic device according to the invention.

SUMMARY OF THE INVENTION

In accordance with the present invention a single crystal of pure or mixed univalent mercury halide is formed having a pair of opposed polished faces, for the entrance and exit of light, at least one of which is perpendicular to a direction which is inclined from the optical axis of the crystal [001] about the crystallographic direction [KHO] by an angle whose value lies from 0.2° to 20°, the face on which the source of the acoustic wave is located is inclined from the crystallographic plane (HKO) about the crystallographic direction $[\overline{KHO}]$ by an identical angle $\alpha$. The source of transverse acoustic wave has a vibration direction is $[\overline{KHO}]$.

In one embodiment the direction [HKO] is preferably chosen to be parallel to the [110] direction, the [KHO] direction chosen to be parallel to the [110] direction and the plane chosen to be the (110) plane.

In another arrangement it is preferable to choose the direction $[\overline{HKO}]$ to be parallel to the direction [100] and the direction $[\overline{KHO}]$ to be parallel to the direction [010].

The advantage of the acousto-optic device according to the present invention consists particularly in the fact that the high values of the acousto-optic quality factor and the high optical and elastic anisotropy of univalent mercury halide crystals can be simultaneously utilized, whereby the parameters of the acousto-optic device are improved considerably.

Another advantage of the acousto-optic device according to the invention is that by using slow transverse acoustic waves the device can handle signals of much longer duration than the devices based on tellurium dioxide crystals.

Still another advantage is that the acousto-optic device according to the invention requires smaller dimensions of the crystal than the acousto-optic devices known hitherto for comparable values of the other parameters. For example, an acousto-optic device from tellurium dioxide $TeO_2$, with the light beam diameter of 40 mm and interaction length of 10 mm at mean frequency of 70 MHz, requires the use of a single crystal of 63 mm minimum dimension in the light propagation direction, whereas the device according to the present invention, with acousto-optic medium of mercurous chloride, requires only a single crystal of dimensions of only 12 to 15 mm in the propagation direction of light, for the same light beam diameter of 40 mm, interaction length of 10 mm at the same mean frequency of 70 MHz.

Compared to the acousto-optic device univalent mercury halide according to the CSSR Author's Certificate No. 170 007, the advantage of the acousto-optic device according to the invention consists in utilizing the optical anisotropy of the these crystals, so that the acousto-optic device according to the invention operates in the anomalous diffraction regime. With all other parameters being maintained, this regime makes it possible to increase by several times the interaction length of the acoustic and light wave and thus reduce the required power input of the high-frequency electrical excitation, or to increase the frequency bandwidth of the device by the same factor at the same length and input power, or to increase accordingly both the bandwidth and length. The acousto-optic device from mercurous bromide single crystal, with inclination angle $\alpha = 2°25'$, interaction length of 9.5 mm and mean frequency of 40 MHz, has the frequency bandwidth of 15 MHz. This compares favourably with the acousto-optic device according to the CSSR Author's Certificate No. 170 007, which requires that the length be shortened approximately ten times in order to attain the same bandwidth. The necessary high-frequency input power for the acousto-optic device according to the invention is thus reduced to 1/9 and the requirement on the power density of the acoustic wave generated by a piezoelectric transducer, hence also the resulting electrical and thermal load on the transducer, is reduced to 1/81 of the value necessary for the device according to the CSSR Author's Certificate No. 170 007.

The advantage of the acousto-optic device according to the invention, as compared against the acousto-optic device described by C. Barta et al., consists in achieving a more uniform frequency dependence of the diffraction efficiency due to the removal of parasitic light diffraction into unwanted direction.

BRIEF DESCRIPTION OF THE DRAWINGS

In the drawing, the single figure illustrates an acousto-optic device formed of an optically anisotropic medium of a single crystal of univalent mercury halide.

DESCRIPTION OF THE INVENTION

Figure 1:
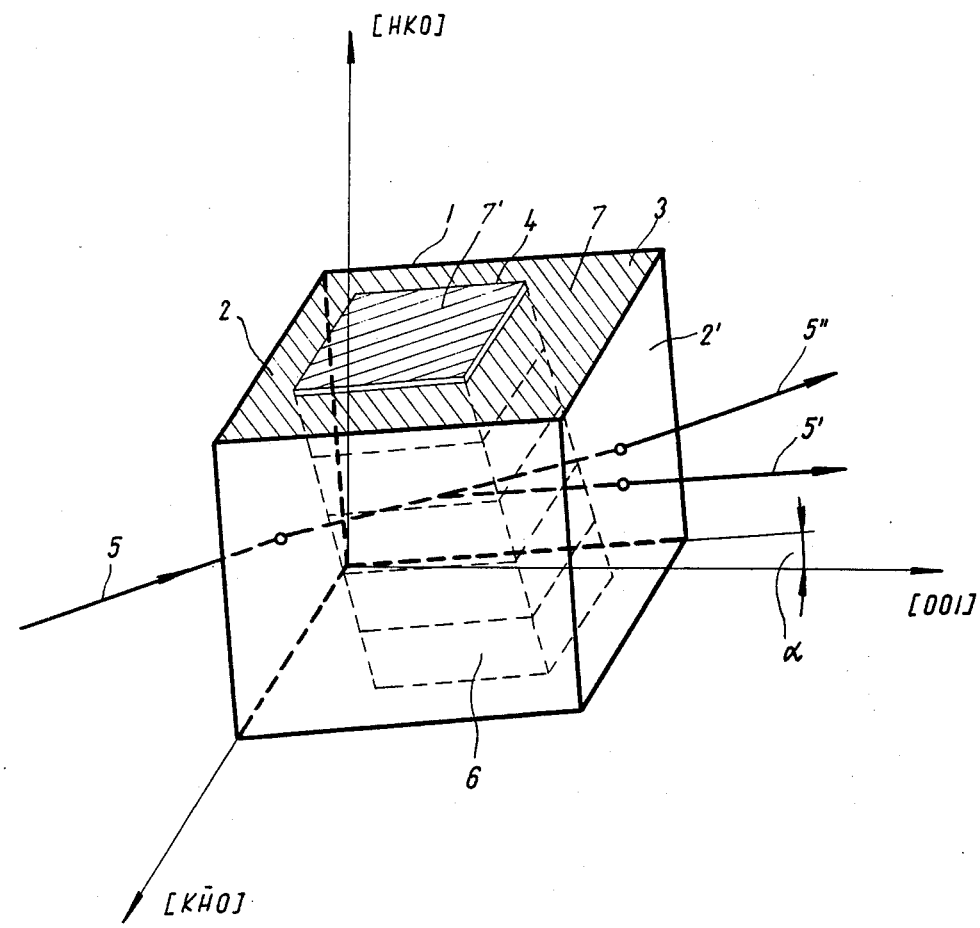

The following Examples set forth several illustrative embodiments of the present invention each of which can be clearly followed with the single drawing in which the crystal formation is schematically shown. In each of the examples an acousto-optic device formed of a single anisotropic crystal structure of univalent mercury halide (roughly illustrated in cubic form) having an acoustic wave source 4. The source 4 is a piezoelectric transducer formed preferably of a single crystal of a lithium compound such as lithium niobate $LiNbO_3$, lithium iodate $LiIO_3$, lithium tantalate $LiTaO_3$, and silicon dioxide $SiO_2$.

The source 4 of acoustic wave may also take the form of a combined system of a plate and a prism of material which has a low attenuation of the acoustical waves such as a fused quartz, which prism is fastened on the top of the single crystal, for example by means of an epoxide resin. On the prism is placed a plate of the piezoelectrical material such as the single-crystal of the lithium niobate $LiNbO_3$. In the case when the source 4 is a mere plate, the bottom area is gilded.

The crystal is ground and formed into a plate, the thickness of which and the crystallographic orientation of which is chosen and thus formed, to provide the frequency and kind of wave desired for each of the respective optic crystals of the examples. The ground plate is equipped with electrodes 7 and 7'.

EXAMPLE 1.

The acousto-optic device according to the invention consists of a mercurous chloride single crystal 1, at least one of whose opposite faces 2,2' is perpendicular to a direction inclined from the direction of the optical axis of the crystal [001] about the crystallographic direction [$\overline{K}HO$] equal to [$\overline{1}10$], by angle $\alpha = 4°$. The face 3 of the crystal is inclined by the same angle $\alpha = 4°$ from the crystallographic plane (HKO), equal to (110), about the crystallographic direction [$\overline{K}HO$], equal to [$\overline{1}10$], and is provided with the source 4 of the transverse acoustic wave having the direction of vibration parallel to [$\overline{1}10$]. The opposite faces 2,2' are polished for the entrance 5 and normal exit 5' of the light wave. Polishing the other faces of the acousto-optic device is not required for its operation; however, it can be advantageous is some cases.

The incident light wave 5 propagates in the acousto-optic device along the ($\overline{1}10$) plane and has extraordinary polarization, i.e. its electric field intensity vector lies in the plane defined by the propagation direction of the wave and by the direction of the optical axis of the crystal. The diffraction of the light wave 5 in the acousto-optic device occurs in the (110) plane. The resulting diffracted light wave 5' has ordinary polarization, i.e. its electric field intensity vector is perpendicular to the plane defined by the propagation direction of the light wave and by the direction of the optical axis [001] of the crystal. Without the acousto-optic interaction the light wave emerges in the direction 5".

EXAMPLE 2.

An acousto-optic device is formed analogously to the arrangement of example 1 but cut in such a way that the crystallographic direction [HKO] is parallel to the [100] direction and the [$\overline{K}HO$] direction is parallel to [010].

The acousto-optic device according to examples 1 and 2 can be used with the advantages previously enumerated for deflecting light beam in data recording systems, in large-surface laser displays, in holographic memories, in systems for optical processing of information—signal compression, adapted filtration, correlation—and elsewhere.

What we claim:

1. An acousto-optic device comprising a single crystal of pure or mixed univalent mercury halide, characterized by having a first face provided with a source of acoustic wave, a pair of opposite faces polished for the entrance and exit of light waves, one of said polished faces being perpendicular to a direction inclined from the optical axis of the crystal [001] about the crystallographic direction [$\overline{KHO}$] by an angle ($\alpha$), said first face being inclined by the same angle ($\alpha$) from the crystallographic plane (HKO) about the crystallographic direction [$\overline{KHO}$] and being provided with a source of transverse acoustic waves vibrating in the [$\overline{KHO}$] direction.

2. The acousto-optic device according to claim 1, wherein $\alpha$ is between 0.2° and 20.0°.

3. The acousto-optic device according to claim 1, wherein $\alpha$ is 4°.

4. The acousto-optic device according to claims 1, 2, or 3, wherein the [HKO] direction is parallel to the [110] direction, the direction [$\overline{KHO}$] is parallel to [$\overline{110}$] direction and the (HKO) plane is parallel to the (110) plane.

5. The acousto-optic unit according to claims 1, 2, or 3, wherein the [HKO] direction is parallel to the [100] direction and the [$\overline{KHO}$] direction is parallel to the [010] direction.

* * * * *